July 25, 1939.  J. E. McLAFFERTY  2,167,029
REINFORCING MEMBER FOR HETEROGENEOUS BEAMS
Filed Nov. 19, 1936  6 Sheets-Sheet 1
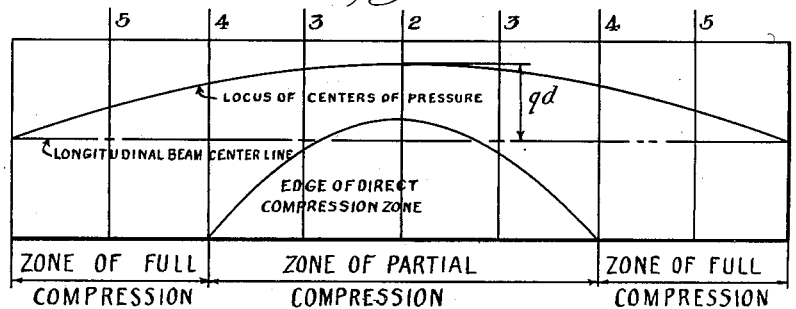
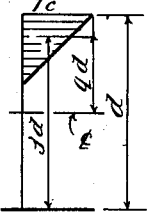 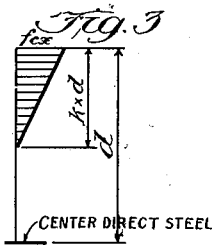 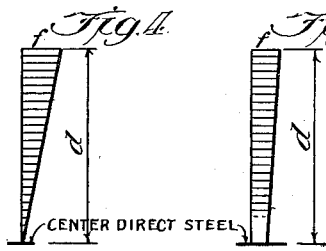 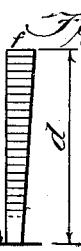
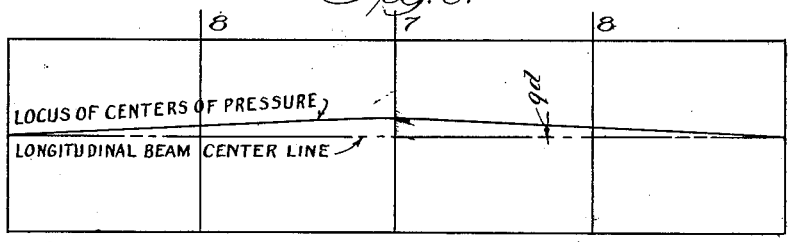
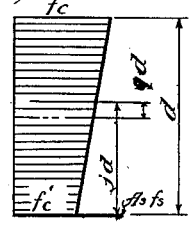 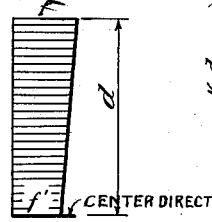 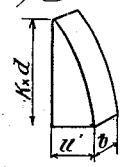 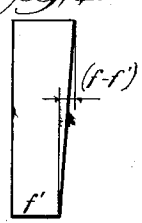
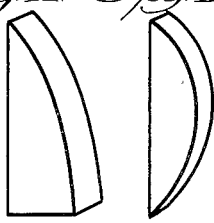 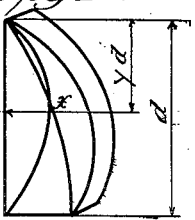 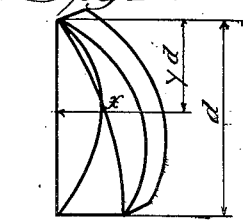
Inventor:
Joel E. McLafferty July 25, 1939. J. E. McLAFFERTY 2,167,029
REINFORCING MEMBER FOR HETEROGENEOUS BEAMS
Filed Nov. 19, 1936 6 Sheets-Sheet 2

Inventor:
Joel E. McLafferty
by Davis, Lindsey, Smith & Shonts
attys

July 25, 1939. J. E. McLAFFERTY 2,167,029
REINFORCING MEMBER FOR HETEROGENEOUS BEAMS
Filed Nov. 19, 1936    6 Sheets-Sheet 3
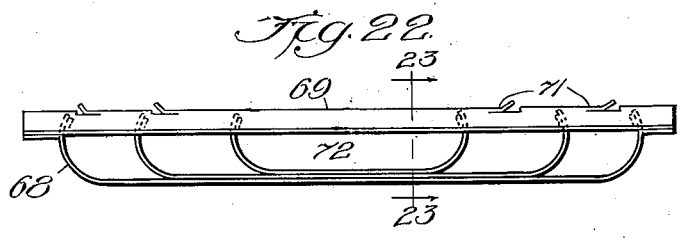
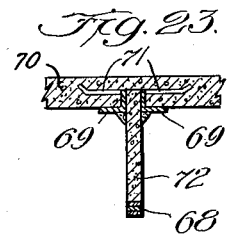
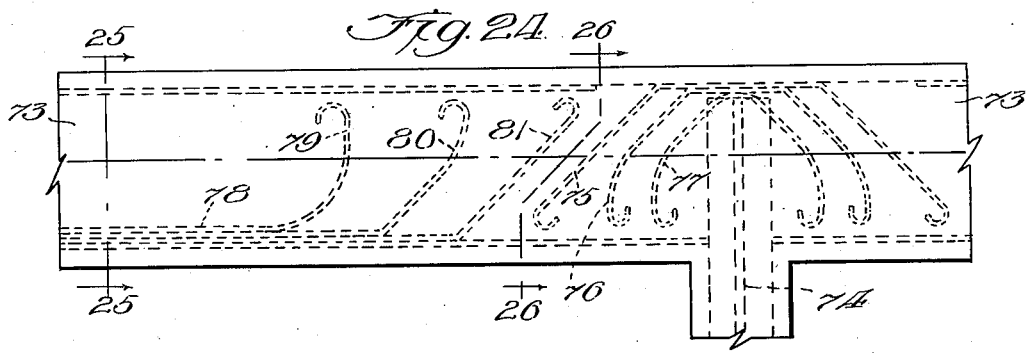
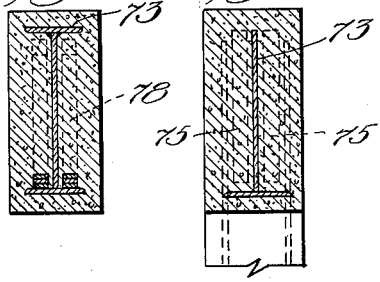
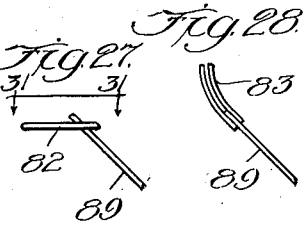
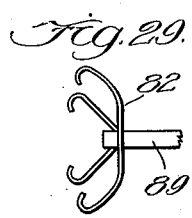
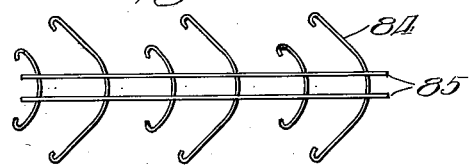
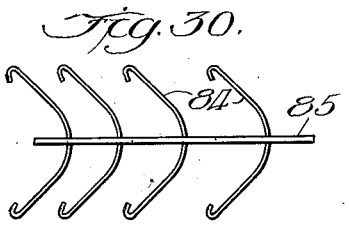
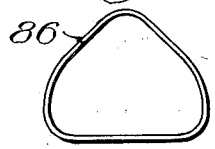
Inventor:
Joel E. McLafferty
by Davis, Lindsey, Smith & Shonts
Attys.

July 25, 1939. J. E. McLAFFERTY 2,167,029
REINFORCING MEMBER FOR HETEROGENEOUS BEAMS
Filed Nov. 19, 1936 6 Sheets-Sheet 4
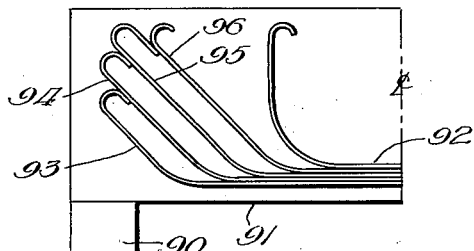
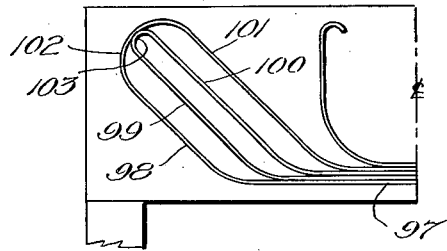
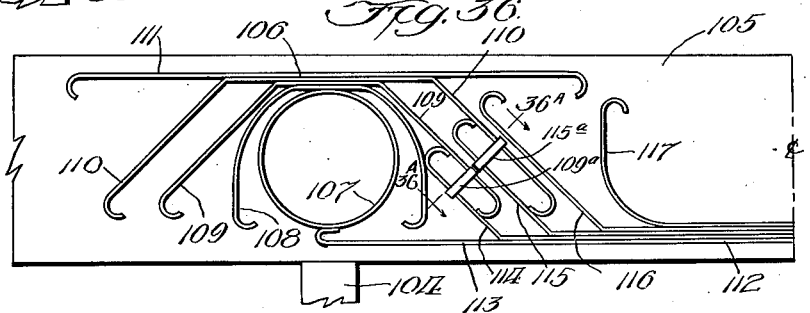
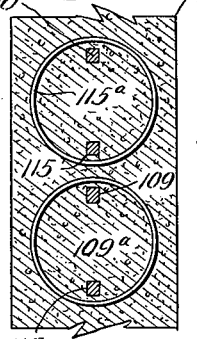
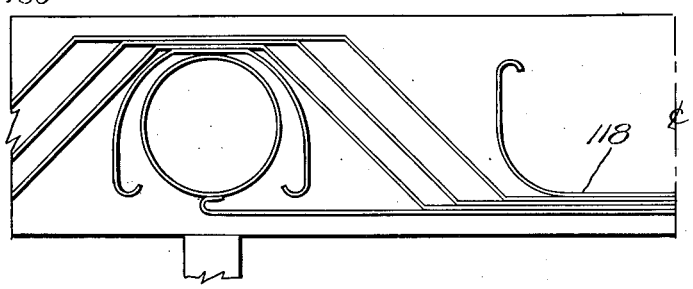
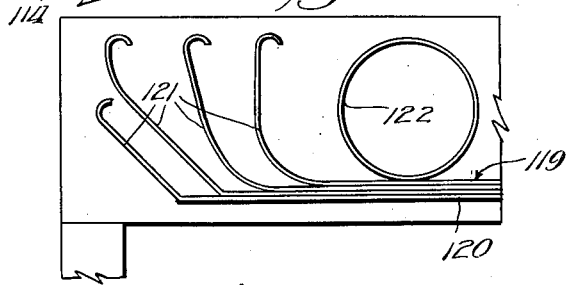
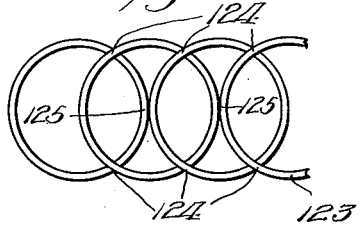
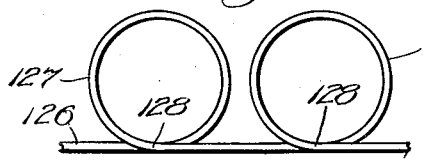
Inventor,
Joel E. McLafferty.
by Davis, Lindsey, Smith & Shonts
Attys.

July 25, 1939.  J. E. McLAFFERTY  2,167,029
REINFORCING MEMBER FOR HETEROGENEOUS BEAMS
Filed Nov. 19, 1936  6 Sheets-Sheet 5
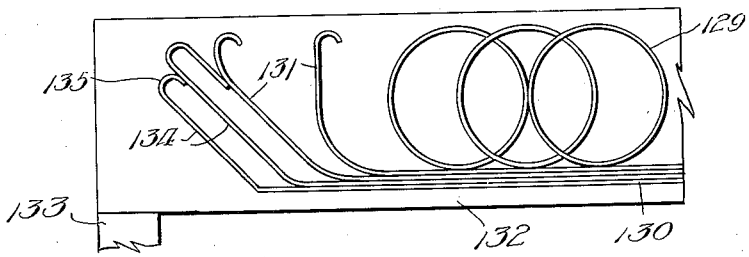
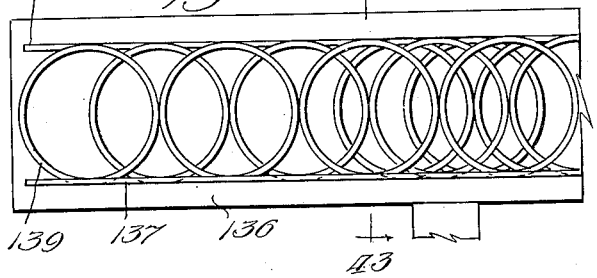 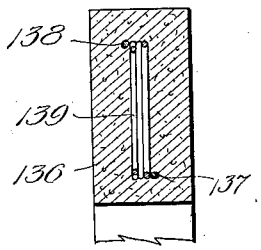
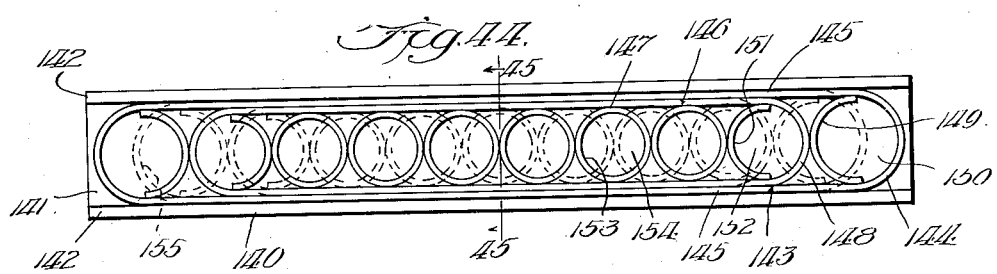
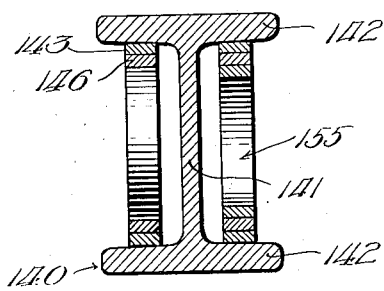
Inventor:
Joel E. McLafferty
by Davis, Lindsey, Smith & Shonts
attys.

July 25, 1939.    J. E. McLAFFERTY    2,167,029
REINFORCING MEMBER FOR HETEROGENEOUS BEAMS
Filed Nov. 19, 1936    6 Sheets-Sheet 6
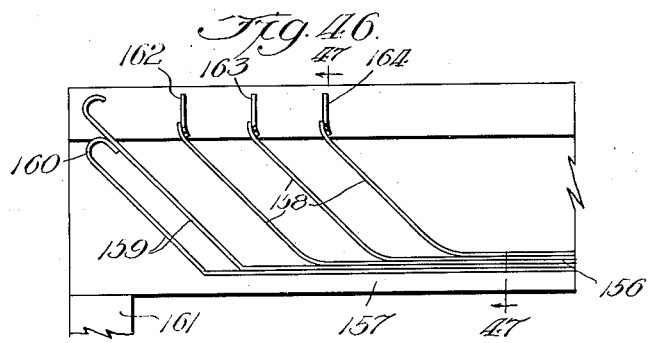
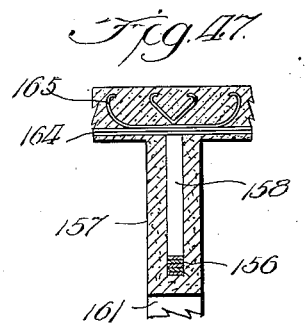
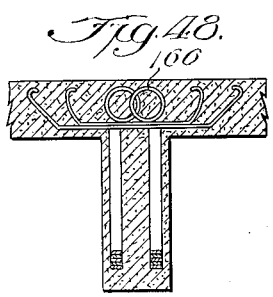
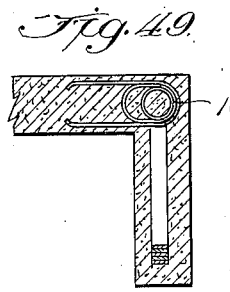
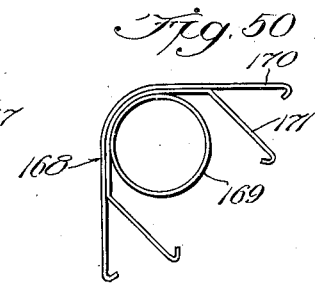
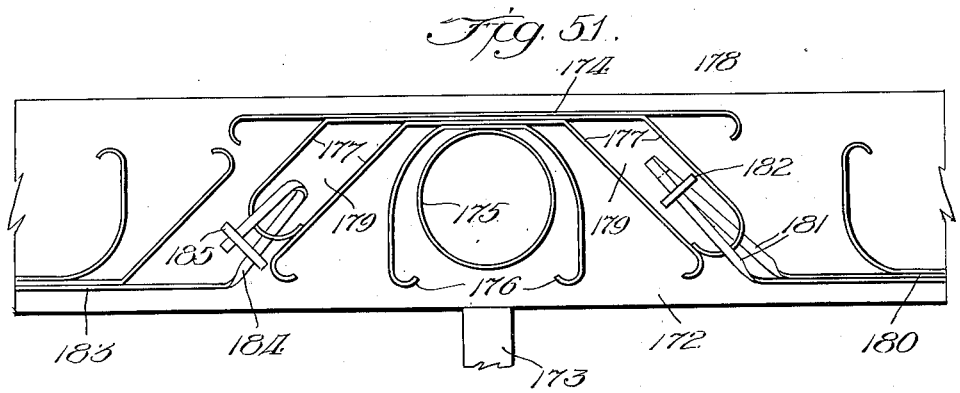
Inventor:
Joel E. McLafferty
by Davis, Lindsey, Smith & Shouts
Attys.

Patented July 25, 1939

2,167,029

UNITED STATES PATENT OFFICE 2,167,029

REINFORCING MEMBER FOR HETEROGENEOUS BEAMS

Joel E. McLafferty, Omaha, Nebr.

Application November 19, 1936, Serial No. 111,608

37 Claims. (Cl. 72—61)

My invention relates to a structural member intended as a reinforcing unit for concrete, masonry, or other heterogeneous structural members, including fabricated joists, in which the components are disposed to more effectively resist the applied stresses, one phase of the invention being concerned more particularly with reinforced concrete constructions which are adapted to carry loads considerably in excess of that permitted by present practice, and which is further characterized by a relatively large saving in weight of the reinforcing unit.

The art of reinforcing members for heterogeneous beams comprises generally two systems which may be termed the compact and the loose bar systems. These systems are broadly deficient in respect of fulfilling either one or both of the following fundamental requirements for maximum strength, namely, that the bars should be fastened together in such a manner that the tensile stresses will not be transferred from one reinforcing element to another through the concrete, and that the tensile element should be properly disposed in the body of the beam to obtain the most effective results.

In the compact bar system, which is now practically obsolete, the tensile elements are clamped or mechanically fastened together to form a compact section at the point of maximum moment, with the ends of the elements diverging into the body of the beam to accommodate diagonal tension stresses. It is well known that this system, in spite of its theoretical economy, has not been accepted by the engineering profession because of its low load resistance.

The loose bar system, which is in general use at the present time, comprises a combination of straight bars, bent bars, and stirrups. This system not only requires considerable labor to insure its correct theoretical position during the pouring of the concrete, but the straight bars and bent bars, which are provided for direct tension requirement, must be separated in the bottom of the beam in order to provide surface areas for bonding with the concrete. Accordingly, not only is the size of the beam increased, but the strength of the beam is impaired by subjecting the concrete to tension in transferring the stress from one bar to another.

Another serious objection to these systems is that no restraint is placed on the flow of concrete in the region of an intermediate support in a continuous beam. The compact system does not offer any restraint, while the loose bar system, with the lapping of straight bars, bent bars, and stirrups, forms substantially a fence without fastened corners.

In order to obtain maximum test results, the reinforcing must be disposed in the direction of the stresses and its component elements must also be restrained against slipping so that they will be able to adequately carry the stresses. Some of the compact systems have approximated the correct direction of the stresses, but have failed to properly fasten the elements together to prevent relative slippage.

The bars in the loose bar system cannot possibly follow the proper direction of the diagonal tension stresses, nor are there any devices to prevent slippage. Properly curved and properly fastened reinforcing elements may be compared to the root system of a tree or to a sack of grain. They can be made to crowd the concrete in the bottom of a beam into compression if methods outlined in my invention are followed.

It is therefore one of the objects of my invention to devise a more efficient structural member having a laminated construction, the member being composed of a plurality of bars which are positively secured to each other intermediate their ends, as by welding, to prevent relative slippage and to form a substantially single bar, the ends of the bars being curved to resist any slipping action thereof under load.

A further object is to provide a member of the character indicated in which the bars may be bent as they are no longer required in direct tension and as they may be required for shear or diagonal tension, certain of the bars, particularly those closer to the center of the beam being curved to more effectively resist the diagonal tension stresses, and the ends of the bent bars, where design conditions require, being provided with hooks to resist and prevent flow of the concrete in that region.

A further object is to devise a structural member in which the component elements are arranged to definitely prevent the transfer of stress from one bar to the next through shear or tension in the concrete, thereby eliminating secondary stresses.

A further object is to devise a reinforcing member for concrete beams in which the composing bars are arranged to definitely place a considerable portion of the concrete portion of the beam in compression, so that more of the compressive strength of the concrete can be depended upon than is now current in standard practice.

A further object is to devise a reinforcing member having a laminated construction for concrete beams wherein the several members may be definitely fixed against displacement at the point of manufacture, so that when delivered at the point where required, absolute assurance is had, not only that the component elements occupy their correct positions, as determined by the designer, but that these positions will not be disturbed by the spouting of the concrete.

A further object is to prevent the flow of concrete in a heterogeneous structure under heavy or concentrated loads, such as occur over a support, by the use of enclosed, reinforcing members whose action is similar to the root tendrils of a tree or that of a sack containing grain and in which the principal metallic member of the structure, such as an I-beam and the like, if employed, is utilized to increase the compressive strength of the concrete.

The present application is a continuation in part of my copending application for a reinforcing member for heterogeneous beams, Serial No. 674,844, filed June 8, 1933.

The design of my improved structural member is based upon a novel theoretical consideration of the stresses operating in a beam which differs in certain respects from the principles now applied in the art. A brief discussion of this theory will be given hereinafter, together with a number of formulas which may be employed in the manner indicated to determine the amount and direction of the stresses operating in different portions of the beam, from which the disposition and shaping of the component elements of the structural member may be determined. Attention will now be given to a general discussion of the advantages flowing from the use of my improved structure and the manner in which it operates, in conjunction with the concrete, for example, to sustain the applied load.

As stated hereinbefore, my improved structure has its component elements disposed so as to more effectively resist the stresses than is now current in standard practice, and actual tests have shown that concrete beams reinforced with this unit have carried, and may be expected by rational theory to carry, loads substantially double that contemplated by present systems of reinforcing which have been designed according to accepted formulas. Moreover, this additional strength is secured notwithstanding a saving of from 15 to 40 per cent in the weight of the reinforcing metal. Because of its greater effectiveness in resisting stresses and its compact nature, it is possible to make concrete beams of a smaller size than with present systems. Besides, when used under conditions requiring fireproof construction and the use of a concrete slab, this unit will produce a concrete beam capable of carrying as great or greater safe loads than present standard, stock-sized, structural beams with the same outside dimensions over the same fireproofing requirements.

One of the outstanding advantages of the unit is its capacity for making an adequate bond within the concrete. In the region of maximum moment in the beam, the unit may be concentrated into a small size, while toward the end of the beam where anchorage and bond requirements with the concrete are important, the total outside perimeter of the unit may be increased greatly over the perimeter at the point of maximum moment by bending the bars as they are no longer required in horizontal tension and as they may be required for shear or diagonal tension. In the controlling maximum moment section, it is unnecessary to waste any space in allowing for the passage of concrete around the individual bars, since, at this point in the beam, the individual bars of the unit are arranged in a laminated construction with the bars securely fixed to each other.

One of the most important requirements in a concrete reinforcement is that the strengthening members which are intended to resist the shear or diagonal tension stresses should be sufficiently long to have an adequate anchorage in the compression side of the beam and so disposed that they will transmit these stresses to the main tension reinforcement. In my improved construction, for simple beams, the unit has the ends of the elements bent to the proper shape to conform to the direction of the diagonal tension stresses, while over the support, a special unit is provided which gives anchorage in the bottom side when the bending moment is reversed over the support, thus obtaining anchorage in the compression side in all cases. By employing the ends of the direct tension elements to resist diagonal tension, it is obvious that material is not wasted in developing the ends of two separate members by anchorage in the concrete.

My product is particularly desirable from the standpoint of the designer due to its greater load resistance and the fact that the correct positioning of the reinforcing element is maintained under conditions of rough handling. Fewer pieces makes for a more compact reinforcing with resulting saving in weight of metal and volume of concrete, and with consequent reduction in beam, column and footing sizes.

The laminated construction of my unit enables the component elements to be securely fastened to each other, as by welding, in order to prevent any possible relative slippage when the beam is subjected to stress, thus providing a unitary construction in that portion of the unit which is welded. For those bars which are bent upwardly, or downwardly, as the case may be, the drop-off in stress in the bent bar is carried to the continuing element through the fastening or weld and not through the concrete which surrounds the bars. This disposition of the elements removes an important source of low resistance in beams.

One of the most important considerations in the correct placement of reinforcing for concrete beams is the determination of the direction of the diagonal tension elements. Present practice does not provide for this factor which is even more important than the strength of these elements. According to present design, the diagonal tension elements are arranged in parallel relation notwithstanding the fact that the actual direction of the stresses varies according to the conditions prevailing at the point under consideration. It will be shown that the nature of the shape of the diagonal tension elements should vary according to the conditions prevailing both along the direct tension side of the beam and also along the direct compression side.

My improved reinforcing device so disposes the diagonal tension elements near the region of maximum moment that they will transmit compressive stress into the body of the beam. By curving the prongs, or diagonal tension elements, as determined by formulas given hereinafter, the prongs will crowd the concrete in the bottom of the beam into compression, instead of permitting the concrete to stretch with the main tension steel, and will also crowd the concrete in the compressive side of the beam into greater compressive resistance.

Accordingly, if we consider a beam which is provided with a reinforcing unit having a number of properly curved bars, then, as the load increases on the beam, more and more portions of the curved diagonal tension elements near the point of maximum moment come into action. When the amount of steel in the beam is sufficient, these curved elements or prongs bind around the enclosed concrete and restrain it from bulging or flowing out at the bottom in a manner somewhat analogous to the action of a sack containing grain. This action, not only results in bringing the compression zone of the beam down to the steel reinforcement, but proper design can insure of the concrete from the top of the beam to the center of the steel reinforcing being placed in uniform compression. Moreover, this curving of the several prongs prevents the concrete in the bottom of the beam from flowing or stretching with the bottom steel and therefore results in from 40 to 100 per cent greater strength than is now possible with standard systems which are not provided with compressive reinforcement.

With my unit, it is not only possible to increase the bending resistance of a beam, but also to very considerably increase the shearing or diagonal tension resistance. If the tension elements in the ends of a concrete beam are placed in the amounts and directions in which the tensile stresses occur, the concrete will be in simple diagonal compression at the ends of the beam and should carry as high a unit stress in that region as it carries in the center of the beam at the point of maximum moment. For example, if a beam were stressed up to 1000 pounds per square inch in diagonal compression, it would have an average shearing stress of 667 pounds per square inch. According to current specifications, however, which are based on experimental data, an allowable unit of shearing stress is 150 pounds per square inch ordinarily and, under special circumstances, as high as 300 pounds per square inch is permitted, in comparison with an allowable compressive stress of 1000 pounds per square inch at the center. If we consider the distance from the center of the steel to the center of the compressive forces as three-fourths the depth of the beam, the average intensity of shearing stress would be 225 pounds per square inch compared with 667 pounds per square inch. This condition indicates that it is possible to increase the shearing resistance from two and one-half to three times the extreme anticipations of present specifications. Actual tests made with beams having the reinforcing constructed according to my formulas have produced results that averaged more than one and three-fourths times the present data.

My improved type of reinforcement also finds special application in a concrete T-beam, where it is possible to use a plane curved, or a three-dimensional curved reinforcement to secure against the shearing stresses between the web and the T. This construction is definitely novel in T-reinforcements. It has not been recognized that the direction of the resultant tensile stress is a combination of the tendency of the T to shear off horizontally and the tendency of the web to deflect vertically. My improved unit materially strengthens this type of beam because the reinforcing can be correctly placed in accordance with the actual direction of the resultant forces.

In connection with beams which rests on an intervening support, it is possible to arrange my improved unit to provide a tie or band over such a support in the region of negative moment for the purpose of restraining the concrete in compression. The reaction of the support tends to squeeze the concrete longitudinally of the beam, so if the concrete over the support is enclosed within a band of the proper shape with the ends of the band securely fastened together, or extended for bonding in the concrete, it will be obvious that the compressive strength of the concrete in this region will be increased in the same manner that the strength of spirally reinforced columns is increased over concrete columns provided with plain tied reinforcings.

It should be understood that my improved unit does not depend on encasement in concrete in order to develop its full structural strength. The diagonal tension elements can either be anchored in the body of the concrete as described above, or by fastening them to a rigid metallic compression or handling member, as would be the case with a fabricated joist. For this reason, the extra concrete on the sides and bottom of a beam, which are ordinarily employed for bonding the bars and for fire protection, can be omitted on joists used in fire-safe or protected constructions, thus rendering possible the use of joists with webs one-fifth to one-third of present requirements, or a saving of from 67 to 80 per cent in web thickness. This arrangement is possible because of the higher unit shearing stresses obtainable as compared with the usual reinforcing in concrete beams or joists having a full web section at bearing.

These and further objects of my invention will be set forth in the following specification, reference being had to the accompanying drawings, and the novel means by which said objects are effectuated will be definitely pointed out in the claims.

In the drawings:

Figure 1 is a diagrammatic elevation of a simple beam in partial compression at the point of maximum moment.

Figs. 2 to 5, inclusive, illustrate the distribution of direct stress at various points of the beam shown in Fig. 1, corresponding to the section lines 2 to 5, inclusive, respectively.

Fig. 6 is a diagrammatic elevation of a beam in which the center section is in complete compression.

Figs. 7 and 8 show diagrammatically the distribution of direct stress along the section lines 7 and 8, respectively, in Fig. 6.

Fig. 9 illustrates the distribution of shearing intensity in a section under partial compression, that is, a section between the lines 3—3 in Fig. 1.

Fig. 10 illustrates the direct stress variation in a section under full compression.

Figs. 11 to 13, inclusive, illustrate diagrammatically the composition of the shearing intensity with full direct compression on any given section.

Figure 14:
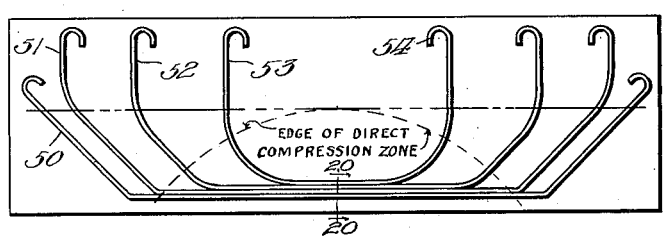

Fig. 14 illustrates a typical reinforcing unit for a simple beam subjected to positive bending, the tension elements being shown in substantially the correct theoretical position for the best results.

Figure 15:
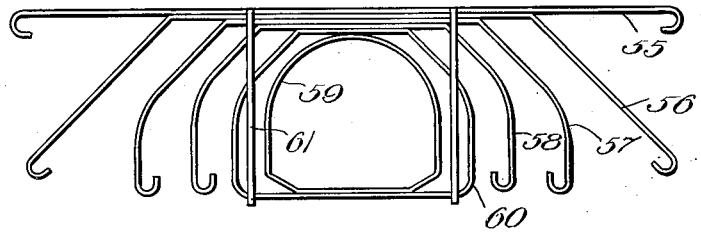

Fig. 15 illustrates a typical reinforcing unit intended to resist negative moment over a support.

Figure 16:
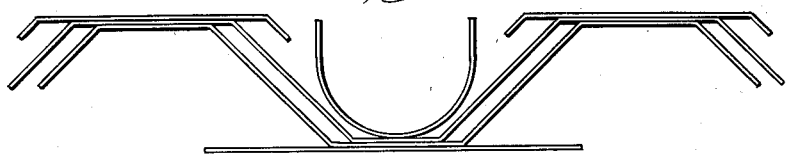

Fig. 16 illustrates diagrammatically an arrangement suitable for a structural condition where it is desirable to have continuous tension elements near the point of inflection, rather than to rely on the overlapping of the tension elements of the positive and negative moment units.

Figure 17:

Fig. 17 illustrates a possible form of the unit where it is desirable to bend the elements on the job.

Figure 18:
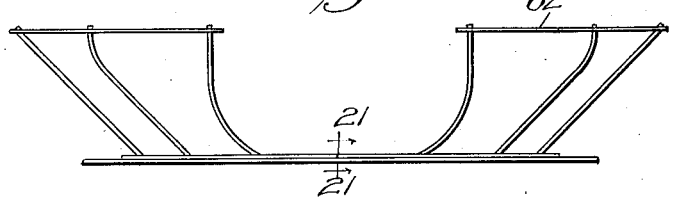
Figure 19:
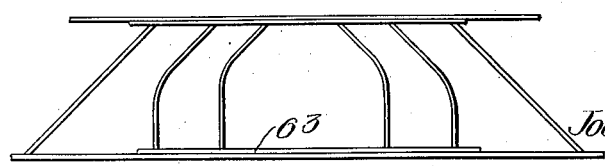

Figs. 18 and 19 illustrate practical forms constituting variations from the theoretical shaping of my improved unit where building codes do not permit the bending of bars as rapidly as my theory of design permits, or where there is a considerable difference in the cost of base bars and small bars.

Figure 20:
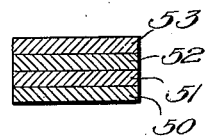

Fig. 20 is a sectional view taken along the line 20 in Fig. 14, showing the preferred laminated section at the point of maximum moment, this section being particularly desirable for the reinforcing units shown in Figs. 14 to 17, inclusive.

Figure 21:

Fig. 21 is a section taken along the line 21 in Fig. 18 at the point of maximum moment, this sectional arrangement being preferable for the compact forms shown in Figs. 18 and 19.

Fig. 22 illustrates the application of my improved unit to joist construction designed for uniform load.

Fig. 23 is a section along the line 23—23 in Fig. 22, looking in the direction of the arrows.

Fig. 24 is an elevation showing the application of my improved reinforcing unit in conjunction with or supplementing a structural beam which is fireproofed with concrete, or other suitable material.

Figs. 25 and 26 are sections along the lines 25—25 and 26—26 in Fig. 24, respectively, looking in the direction of the arrows.

Figs. 27 and 28 are elevations showing the use of plane and three-dimensional curved anchorage members, respectively, for use with T-beam reinforcements, while Fig. 29 is a plan view of the anchorage arrangement shown in Fig. 27, it being understood that the same plane curvature also obtains for the three-dimensional curved bar shown in Fig. 28.

Figs. 30 and 31 are plan views illustrating variations of the curved anchorage members as attached to one or more cross pieces for use where the T-reinforcement attached to the main reinforcing diagonal tension elements are liable to become entangled during shipment.

Fig. 32 shows a welded tie or band for reinforcing the region of negative moment over the support, as shown in Fig. 15.

Fig. 33 shows a modification of a similar type of tie wherein the ends of the tie instead of being securely fastened to each other, are extended for bonding or anchorage with the concrete.

Fig. 34 is a half elevation of a uniformly loaded, rectangular, simple, concrete beam showing the relation of my improved reinforcing thereto under conditions of low end restraint.

Fig. 35 is a view similar to Fig. 34, but in which the reinforcing is arranged to resist severe end restraint.

Fig. 36 is an elevation of a part of a uniformly loaded, continuous, rectangular beam showing separate reinforcing members for resisting negative bending over an intermediate support and positive bending in that portion of the beam between a pair of adjacent supports, the relation of the intermeshing shear prongs which carry the load to the top of the support, and bands encircling the prongs for preventing spreading of the concrete under the opposing pull of the prongs.

Fig. 36A is a section along the line 36A—36A in Fig. 36, looking in the direction of the arrows.

Fig. 37 is a view similar to Fig. 36, but showing the negative and positive reinforcing members joined to provide a unitary reinforcement.

Fig. 38 is a half elevation of a concrete beam of simple span showing the preferred arrangement of the reinforcing member under a condition of fixed, concentrated loading.

Figs. 39 and 40 show reinforcing details that may be used in connection with any of the modifications of my improved reinforcement and are particularly desirable in heterogeneous constructions intended to support moving loads.

Fig. 41 shows the application of the reinforcing detail illustrated in Fig. 39 to a concrete beam of simple span which is otherwise provided with my improved reinforcing and intended to support a moving concentrated load.

Fig. 42 is an elevation of a continuous beam subject to reversible stresses such as occur in a building under wind loading and which is provided with a type of reinforcing specially designed to resist such stresses.

Fig. 43 is a section along the line 43—43 in Fig. 42, looking in the direction of the arrows.

Fig. 44 is an elevation of a unitary system of reinforcing which embodies a structural beam, such as an I-beam or the like, and other metallic elements interposed between the flanges for the purpose of resisting direct tension and preventing flow of the concrete in which the principal beam and the reinforcing are embedded, the concrete within which the system is embedded being omitted for sake of clearness.

Fig. 45 is a section along the line 45—45 in Fig. 44, looking in the direction of the arrows.

Fig. 46 is a half elevation of a simple, concrete, T-beam incorporating my improved reinforcing.

Fig. 47 is a section along the line 47—47 in Fig. 46, looking in the direction of the arrows, and showing one type of reinforcing that may be employed in the T of the beam.

Fig. 48 is a section similar to Fig. 47, but showing a T-beam having a larger cross section and a wider T, and a modified type of reinforcing in the T of the beam for preventing flow of the concrete under a concentrated load as well as resisting bending.

Fig. 49 is a cross section of a T-beam having a T only on one side of the web and showing a reinforcing in the web for resisting direct tension and shear and a reinforce in the T-portion for assisting compression of the concrete in the T.

Fig. 50 is an elevation of a reinforcement that is a variation of the reinforcement illustrated in Fig. 15 but more particularly intended for use in wall corners or to provide end restraint in an exterior column.

Fig. 51 is a view similar to Fig. 36, but showing some of the prongs from the positive and negative reinforce units arranged in a substantially linked relation and a band encircling one or more of the prongs from the same reinforce.

Before discussing in detail the various modifications which my improved reinforcing unit may assume, reference will first be had to Figs. 1 to 13, inclusive, for the purpose of briefly discussing the theory of design upon which the unit is based and also to list the several formulas which may be employed to determine the direction and amount of the stresses operating throughout the beam.

The theory of laminated reinforcing design essentially differs from present design theories in that the shear prongs localize the direct stress at the point of maximum moment and restrict this stress as much as possible to the compression face of the beam. Beginning with a maximum direct compressive stress at the extreme fiber of the beam at the point of maximum moment, the triangle of compressive forces increases in depth toward the bottom of the beam so that the summation of the compressive forces in the concrete at all times equals the tensile forces in the steel. This triangle when the cross sectional area of the steel is sufficient becomes a trapezoid or parallelogram of forces. The resisting moment in either case will be the product of the amount of compressive or tensile force and the lever arm or distance between the centers of gravity of these forces.

The resisting moment, M, at the point of maximum moment of a rectangular concrete beam having a laminated reinforcing unit can be determined by the following formulas when the section at the point of maximum moment is in partial compression, reference being had to Fig. 1, which shows a side elevation of a characteristic beam and also to Fig. 2 which shows the direct stress distribution at the point of maximum moment.

(201) $$M = \frac{1}{2} f_c k j b d^2 = A_s f_s j d = \frac{3}{2} f_c g j b d^2$$

(202) $$g = \frac{2 A_s f_s}{3 f_c b d}$$

(203) $$j = 1 - \frac{k}{3}$$

The factors in the above formulas may be identified as follows:

$b$ = breadth of the beam.
$d$ = distance from compressive face to center of steel, effective depth.
$f_c$ = maximum unit concrete compressive stress at point of maximum moment.
$f_s$ = unit stress in steel.
$kd$ = depth of triangle of compressive forces.
$gd$ = distance from compressive face to center of compressive forces.
$jd$ = distance from center of steel to center of compressive forces.
$A_s$ = Area of steel at point of maximum moment.

When the complete section at the point of maximum moment is in compression, the following formulas apply, reference being had to Figs. 6 and 7:

(204) $$M = \frac{(f_c + f'_c)}{2} j b d^2 = A_s f_s j d$$
$$= \left(\frac{f_c}{6j - 2}\right) j b d^2 = f_s p j b d^2$$

(205) $$j = \frac{f_c}{6 f_s p} + \frac{1}{3}$$

In formulas 204 and 205, the following additional factors are identified thus:

$f'_c$ = unit compressive stress on concrete at bottom of trapezoid of compression at point of maximum moment.

$p = \frac{A_s}{bd}$ = ratio of steel area to concrete area.

In order to determine the magnitude of the direct compressive stress at any point in the beam other than the point of maximum moment, it is assumed that the ordinates of the locus of the centers of pressure, referred to the longitudinal center line of the beam, are proportional to the bending moment diagram, these ordinates at the point of maximum moment being indicated in Figs. 1 and 6 and denoted as $qd$. In a rectangular beam where the section at the point of maximum moment is only partially in compression (See Figs. 1 and 2) there would be a length of the beam (see Figs. 1 and 3) extending on opposite sides of the point of maximum moment in which the direct compression zone drops further and further down toward the extreme lower fiber of the beam, as illustrated by the curved line in Fig. 1 and marked thus, "Edge of direct compression zone," this zone extending between the section lines 4—4. At the ends of the beam, or outwardly of the sections denoted by the lines 4—4, there will be portions of the beam in which the sections are in full compression, as shown in Figs. 1 and 5.

In a rectangular beam where the full section at the point of maximum moment is in compression, as shown in Figs. 6 and 7, the condition of stress at other points is illustrated in Fig. 8.

Since the etxernal bending moment equals the exerted, internal resisting moment, and the lever arm or the distance from the center of pressure to the center of the tension steel can be determined by the assumption that its ordinates referred to the longitudinal center line are proportional to the bending moment at the section under consideration, the total amount of direct force exerted at the section may be computed and also by straight line interpolation the direct compressive stress at any point in the section.

In order to determine the distribution of the gross shear or to determine the unit shear of any section of any beam, the following consideration applies. For the sections in which the direct compressive force varies from a maximum at the extreme fibre of the beam to zero lower down in the beam, as in Fig. 3, for the zone of partial compression, there will be a parabolic distribution of the gross shear as illustrated in Fig. 9, with zero shear at the extreme compressive fibre and maximum shear where the direct compressive force becomes zero.

To determine the unit shear for sections in which the direct compression is uniform for the entire section, as would occur directly over a support in a simple beam, the parabolic distribution of shear is illustrated in Fig. 12, with no shear at the extreme fibre and maximum shear at the center. For sections in full, direct compression, as illustrated in Fig. 10, the gross shear is proportioned according to the magnitude of the varying direct force ($f - f'$), as illustrated in Fig. 11, and the magnitude of the uniform direct force ($f'$), as illustrated in Fig. 12, and combined to determine the unit shear for any point in the section as illustrated in Fig. 13.

The outline given in the preceding paragraph will enable any one familiar with the mechanics of material to determine the direct unit compressive force ($f$) and the unit shearing stress ($v$) at any point in the beam.

By using the established formulas for homogeneous beams as given immediately below, it is possible to accurately determine the intensity of the combined unit compressive stresses ($c$) and the combined unit tensile stresses (t), as follows:

(206) $$c = \frac{f}{2} + \sqrt{\frac{1}{4}f^2 + v^2}$$

(207) $$t = \frac{f}{2} - \sqrt{\frac{1}{4}f^2 + v^2}$$

The value $\theta$, which is the angle that the combined compressive stress (c) makes with the longitudinal center line of the beam, may be determined by the following formula:

(208) $$\tan 2\theta = \frac{2v}{f}$$

The direction of the combined tensile stress $t$ is at right angles to the stress marked $c$.

The amount of steel required to reinforce the body of the beam against diagonal tension need not be calculated, since the diagonal tension or shear is the drop-off in the direct tensile stress in the bottom of the beam. The fibers of the steel, separated from the main body of the steel as they are no longer required for the direct tensile stress and bent in the direction of the computed combined tensile stresses, will resist these combined tensile stresses if properly anchored near the compressive side of the beam.

By applying the formulas listed above, it can be demonstrated that the following condition is true. The shape of the diagonal tension elements as they depart from the main body of the reinforcing depends upon whether the full section at the point where the bar is bent is in direct compression. In a simple beam, for example, application of the formulas conclusively show that the diagonal tension stress is inclined at substantially 45 degrees along the bottom of the zone of full compression, along the edge of the zone of direct compression, and in the body of the beam directly above the support. Accordingly, the diagonal section elements should leave the main body of the reinforcing in the full compression zone with a comparatively sharp bend, but, in the zone of partial compression, they should leave the main body with an easy curve to prevent their straightening out under load and pulling the concrete apart.

At the compressive face of the beam, or at the face having the greatest direct compression, the theoretical direction of the diagonal tension elements is at right angles to the longitudinal center line of the beam. The sharpness of the curve which is formed near the end of the prongs varies according to its position in the beam. For example, toward the end of a simple rectangular beam, the prongs curve sharply from their vertical direction at the compressive face because the intensity of the shearing stress increases very rapidly in proportion to the direct stress, while toward the center of the beam where the unit shearing stress is not very large and the direct stress is comparatively large, the curvature of each diagonal tension element is comparatively flat.

In a simple T-beam, the curvature of the ends of each prong is practically the same as in a rectangular beam near the support, but closer to the center of the beam, a different condition may occur. The reason for this difference is that the shearing intensity between the top and bottom of the T increases with greater rapidity than would be the case in a rectangular beam. The result is that the prongs may have a theoretical inclination of substantially 45 degrees at the bottom of the T near the center of the beam.

Strengths anticipated for Formulas 201 to 205, inclusive, have been obtained in actual tests within a range of 99 per cent to 107 per cent of anticipation by the use of welded, laminated reinforcing having prongs which depart from the main reinforcing with a curvature whose radius equals the depth of the beam and which terminate in hooks. Increased strengths resulting from a sharpening of the curvature are discussed in the following paragraph.

The purpose of reinforcing concrete is to prevent or stop the flow of the concrete under load. When a concrete cylinder, for example, is subjected to a vertical load, it is shortened in its vertical dimension and extended in its horizontal dimension, so that it may be considered as flowing in a substantially horizontal direction. This flow of the concrete occurs at right angles to the direction of the predominant compressive force. Near the top center of a simple uniformly loaded beam, where the compressive forces are parallel to the longitudinal center line of the beam, the flow is in an upward direction, so that it is desirable to place the shear prongs in the same direction. In a continuous beam, that is, one which rests on intervening supports between the ends of the beam, the direction of flow between the points of inflection of a fully continuous span is the same as in a simple beam. When the point of inflection is passed, the direction of the flow over the support is reversed and the tendency is to squeeze the concrete out at the bottom.

At such intervening supports, or at any similarly applied concentrated load, the reaction load tends to push up into the mass of concrete so that the flow of concrete at this point is in a generally horizontal direction, or at right angles to the reaction. The flow of concrete follows the direction of the combined compressive stresses as long as the influence of the reaction or concentrated load is predominant. However, as soon as the bending action of the beam becomes predominant, the flow of concrete follows the direction of the combined tensile stresses radiating from the top of the beam over the support. Hence, a tie across the bottom following the direction of the combined compressive stresses and continuous with downwardly extending prongs following the direction of the combined tensile forces, both of which may be determined by formula 208 indicated above, will stop this flow of concrete. When the support takes the load of only one level of beams, or with the concrete section in partial compression, this tie will generally be shaped like a triangle with curved sides, or it may be shaped as a trapezoid with curved sides. If, however, the support in addition is intended to carry the load from upper levels of beams which are transmitted through the beam webs to the support, or if the beam section is in full compression, the tie is preferably shaped more like a diamond with curved sides.

There is an essential difference between my method of reinforcing for compression by means of enclosing ties and the present method of using direct steel in the compression side. Present methods rely on the greater modulus of elasticity of the steel to furnish an element with greater resistance in the direction of the direct compression stress. In some cases such as over a support, no web ties are installed to prevent buckling of this compression reinforcement.

My method of reinforcing for compression (or flow or spreading of concrete) is to direct the ends of the diagonal tension elements toward each other after they have entered the direct compression zone. Experiments have proved satisfactory in which the shape of the indicated elements has followed the combined tensile stress, as determined for sections in partial compression, on leaving the direct reinforcing and after passing through a suitable transition curve have then followed the combined compression stress toward the load. The mathematics indicate, however, that their function is tensional. My method prevents the concrete from buckling away from the beam. The other method may increase the tendency to buckle.

In the case of a fixed load, the enclosing element will give mathematically predictable results, if the ends of the prongs pass under the load in the compression side of the beam, because the pressure of the load on the ends of the prongs is sufficient to prevent flow. In the case of a moving load, however, it is desirable to fasten the prongs together in the compression region into a closed loop to prevent flow. It is necessary, in all cases where predictable results are to be consistently obtained, to fasten the bottom of the enclosure to the direct tension reinforcing.

Tests of specimens of my design having curved web members directed toward and under separated, concentrated loads, but having no direct compression reinforcing parallel to the compression edge of the beam, showed marked increase in load-carrying capacity over similar specimens without prongs positioned under the loads. The foregoing shows that the compression resistance of concrete can be increased without requiring steel disposed in what has heretofore been considered the critical location.

On the other hand, tests on other specimens have indicated that direct reinforcing, parallel to and near the edge of the beam subject to compression, is liable to premature buckling, if not properly restrained by ties anchored in the web. Present practice results in decreased strength unless vertical web steel is provided to give a component stress which my invention considers critical. One of the objects of my invention has been to provide reinforcing in the form of enclosing ties or webs of structural beams which are disposed in the critical direction.

The increased compressive strength $(f+c)$ of the concrete in a beam with incurving prongs may be expressed for a single enclosure by the following formula:

(209) $$f+c = f_c\left(1 + \frac{3.78 A_q f_s}{bQ}\right)$$

Where
$f+c$ = new concrete fibre stress due to enclosure
$A_q$ = cross-sectional area of steel in one side of an enclosure
$Q$ = total distance on either side of load to sides of enclosure as measured along longitudinal center line of beam The other nomenclature has already been described in an earlier part of the application. In use, the new concrete fibre stress $(f+c)$ is substituted for the value $f_c$, as shown in formulas already given for bending resistance.

Referring to Figs. 14 to 33, inclusive, which illustrate different types of structural units in which the disposition and arrangement of the component bars have been calculated according to the formulas listed above, and considering first the type shown in Fig. 14 which illustrates a laminated reinforcing unit for a simple concrete beam subjected to positive moment, the numerals 50 to 53, inclusive, designate a plurality of bars which, for a predetermined distance on opposite sides of the point of maximum moment, are arranged in superposed relation and are welded or otherwise securely fastened to each other to prevent relative slipping. The weld may be continuous, or intermittent lengths of continuous weld, or groups of spot welds placed at sufficiently close intervals may be employed, thus preventing the initial slippage characteristic of the mechanical clamps or bands used in the compact system of reinforcing. At different distances from the point of maximum moment, these bars are bent upwardly out of the plane of the center section of the reinforcement to form prongs, as stress conditions demand, the point at which each bar is bent and the nature of the angle or the degree of curvature which the prong makes with the horizontal portion being determined by suitable formulas selected from the foregoing analysis. As indicated, each bar, up to and at the point where it is bent, is securely anchored to the other similar bar portions so that the latter are definitely restrained against relative slippage and separation. In the characteristic unit shown, it will be noted that the curvature of the prongs progressively increases, respectively, inwardly toward the point of maximum moment, and that their angle with the horizontal also progressively increases in the same direction. The ends of each of these bars are generally formed as hooks 54 in order to secure firm anchorage with the concrete and to prevent relative flow of the concrete along the bar. Attention is particularly directed to the disposition of the curved prongs and the analogy which they bear to a sack containing grain, as regards the uniform distribution of the stresses along the bars.

It will be understood that while the particular disclosure in Fig. 14 shows a laminated center section with the prongs formed by bending up the bars from this section, the invention is not to be so limited, since the center section may or may not have a laminated construction, and the prongs may or may not be continuations of the bars comprising the laminations. In other words, the prongs may be attached to the center sections, as by welding or other suitable devices. In any case, however, the construction is featured by certain very important characteristics. As clearly shown in Fig. 14, the diagonal tension elements are not only characterized by varying lengths, but by varying horizontal projections. Moreover, the degree of curvature of the diagonal tension elements, as they depart from the beam face of greater compression, decreases as they advance toward the intermediate portion of the main body of the reinforcing having the maximum cross section.

In Fig. 15 is illustrated a laminated reinforcing unit having a shape preferred for resisting negative moment in a beam which rests on an intervening support. In this arrangement, the bars 55 to 58, inclusive, occupy substantially the same relation as do the bars 50 to 53, inclusive, shown in Fig. 14, except that in the former case the arrangement of the bars is reversed and also excepting for the disposition of the ends of the bar 55 which are merely extended in a straight line to resist the simple tensional stresses and also to provide the necessary bond with the concrete. The bars 59 and 60 are formed as ties having a general trapezoidal shape in which three of the sides may be curved and in which the ends of the bars are securely fastened to each other to complete the tie enclosure and to prevent flow of concrete due to the reaction of the support. In this connection, it should be noted that the bars 55 to 58, inclusive, provide for either direct tension or diagonal tension, but do not operate as a tie in the same manner as do the elements 59 and 60. The ends of the bars are also preferably provided with hooks for the same reason as denoted for the unit shown in Fig. 14. If desired, the element 61 may be incorporated in the structure to act as a chair for the purpose of insuring the correct position of the reinforcing, although tests indicate a reasonable proportion of such elements may be relied on to increase the compressive resistance of the beam in which it is embedded.

In Fig. 16 is illustrated a possible form of the unit wherein the bars are shaped so as to provide continuous tension elements near the point of inflection where a beam changes from positive to negative bending, the ends of the bars which lie near the bottom of the beam to resist tension stresses being bent upwardly to lie close to the upper fiber of the beam over the support to resist tension stresses in this location. This arrangement is intended as a substitute for the characteristic construction wherein reliance is placed on the overlapping of the tension elements of the positive and negative moment units.

Fig. 17 shows a simple laminated construction, showing a suggested manner in which the bars may be bent on the job to avoid entangling in shipment.

In Figs. 18 and 19 are illustrated modifications of the preferred forms of structure shown in Figs. 14 and 15, and which it is contemplated may be employed in regions where building specifications would not permit the bending of bars according to my improved theory of design. In the laminated type shown in Fig. 18, the ends of the bent-up portions of the bars, instead of being formed as hooks, as in Fig. 14, may be tied together by simple bars, such as 62. Similarly, in Fig. 19, the downwardly-extending, bent portions of the bars may be joined by simple bars 63, Fig. 19 being intended as a possible substitute for the preferred type shown in Fig. 15.

In Figs. 22 and 23 is illustrated the application of my improved type of reinforcement to fabricated joists, in which the numeral 68 designates the bars, arranged generally similar to the bars shown in Fig. 14, which are intended to resist the direct and diagonal tension stresses. The bent-up ends of these bars are connected to a metallic handling or compression member or members 69, which may have the angle section shown in Fig. 23, and which may also be utilized as the support for a floor slab construction 70. Where the compression member 69 supports such a concrete slab, the anchorage 71 may be provided by shearing prongs out of the members 69, or by attaching to the member 69 anchorage devices similar to those indicated by the numerals 82, or 165, or 166, in Figs. 29, 47 and 48, respectively. The compression forces in the web are furnished by the concrete 72, as shown in Fig. 23. The compressive resistance of the web may be increased by the use of additional enclosures, such as those illustrated in Figs. 39 and 40. In cases where the concrete web is not cast on the job, it is desirable to connect the top member 69 to the bottom main tension member as a precaution against damage in handling. Conventional methods of strengthening, such as separators to reduce the unsupported length of the handling member 69 or plates to reinforce the cantilever end, may be used on heavier joists. All members of this construction, except the web 72, are fastened together by welding or other appropriate fastening means. The concrete for the web 72 may be placed with the framework of the joist lying on its side on a form.

In Figs. 24 to 26, inclusive, there is illustrated an arrangement of my improved reinforcing in conjunction with and assisting structural beams 73 which are fireproofed with concrete and rested on a column 74. The elements 75, 76 and 77 which are disposed over the column 74 to resist negative moment may be welded into one unit before shipment, or shipped in groups and welded in the field after they have been inserted in the holes provided in the structural column. Similarly, the structural unit 78, which may be composed of the bars 79 to 81, inclusive, may be welded in the shop or in the field and placed in the beam 73 for resisting positive moment. It will be understood that best results with the construction shown in Figs. 24 to 26, inclusive, will be obtained by positively connecting the reinforcing to the structural beam, as by welding or otherwise, so that the metallic portions of the unit proper will be intimately associated.

Figs. 27 to 29, inclusive, illustrate novel and practical forms of anchorage for T-beams wherein the anchorage in the T-portion of the beam which engages with the ends of the bent bars 89 in the web may be shaped with a simple plain curve denoted by the numeral 82 in Fig. 27, or it may possess the three dimensional curve indicated by the numeral 83 in Fig. 28, it being understood that, in plan view, each anchorage is shaped with the curve designated by the numeral 82 in Fig. 29. The T reinforcement in these figures is welded to the prong 89. When the T reinforcement is shipped separately, provision should be made for a hook or anchorage at the end of prong 89 to insure the cooperation of the T reinforce with the main reinforce.

In Figs. 30 and 31, there are illustrated two arrangements for spacing the cross pieces 84 intended as anchorage members in a T-beam by means of a member or members 85 in order to prevent entangling of the parts during shipment.

In Fig. 32, the numeral 86 designates a welded tie or band for reinforcing the region of negative moment over a support, such as is illustrated in Fig. 15, the ends of this band being welded or otherwise fastened together. The numeral 87 in Fig. 33 designates a modification of this tie in which the ends of the tie are not fastened together but are extended to provide the members 88 which are bonded in the concrete and therefore resist the tendency of the enclosed portion of the tie to spread under the pressure of the support.

In employing the illustration of a sack of grain to explain the nature of the stresses operating in a heterogeneous beam, it should be remembered that a sack will restrain the grain in it if the flaps of the sack are not fastened together under the load placed on the top of the open sack, but are merely gripped by this superimposed load. The prongs in Fig. 33 therefore do not need to extend beyond each other, but may be directed toward each other sufficiently to insure that the load will grip these prongs. The fact is not recognized in present day design that the compressive strength of concrete beams with provision against excessive relative slippage and separation is dependent upon the reinforcing which is disposed vertically and curving in toward the load, rather than on the horizontal reinforcement in the compressive zone.

Referring to Fig. 34 which illustrates a portion of a uniformly loaded, rectangular, simple beam, the numeral 90 designates a typical support upon which rests one end of a beam 91 that is provided with a reinforcing, generally indicated by the numeral 92, and which may be of the general type illustrated in Fig. 14, except as presently indicated. In this modification, the diagonal tension and shear prongs 93, 94, and 95 have their ends curved and respectively attached to prongs 94, 95, and 96, thereby forming enclosures having curved ends and within which the concrete is held against any tendency to flow occasioned by the reaction of the support 90. A reinforcement of this type is more particularly intended for beam structures subjected to low end restraint. Fig. 34 illustrates the conditions at an exterior support, but may be used over an interior support if the members 93, 94, 95 or 96 are more sharply curved, as indicated, for example, in Fig. 38, and the end of the member 96 is extended sufficiently to be held by the load.

In Fig. 35, there is illustrated a beam arrangement somewhat similar to that shown in Fig. 34, but under conditions in which the beam is subjected to severe end restraint. The numeral 97 designates a typical reinforcing according to my invention, but in this case, the diagonal tension elements 98 and 101 form continuations of each other and are connected by a curved, metallic portion 102, while the similar elements 99 and 100 are likewise related and are connected by a curved, metallic portion 103 which is fastened to the portion 102, thereby providing a section for resisting end restraint, that is, negative bending, which is offset from the part of the reinforce that resists positive bending.

In Fig. 36, there is illustrated a system of reinforcing for resisting positive and negative moments in a uniformly loaded, continuous, rectangular beam that is immediately carried by a support. In this figure, the numeral 105 designates a concrete beam which rests at some point intermediate its ends on a support 104. Embedded within the beam over the support is one of my characteristic reinforcing members 106 as illustrated in Fig. 15 and having the usual intermediate and laminated portion formed by appropriately connecting a plurality of bars, this laminated portion being embedded within the beam adjacent the upper side thereof and incorporating an enclosed tie 107 formed by suitably bending one of the component elements of the reinforcing member, the tie 107 being located immediately over the support 104 and intended to restrain the flow of concrete in this locality. The tie 107 may possess the simple circular shape indicated, but in many cases would approximate the theoretically correct shape illustrated in Fig. 32. The reinforcing member may also include at each end a downwardly curved prong or element 108 for resisting diagonal tension and shear, straight prongs or elements 109 and 110 for picking up the load from the mid-span of the beam, and also a reinforcing element 111 which acts as a reinforce against conditions of partial loading. These prongs or elements extend from the intermediate portion in the manner above described.

In the mid-span to the right of the support 104, there is located within the beam a positive reinforcing member 112 as illustrated in Fig. 14 and disposed with its intermediate portion adjacent the lower side of the beam to resist horizontal tension in this locality. The member 112 also includes an element 113 which extends toward the support 104 and reinforces the beam against conditions of partial loading, and elements 114, 115, and 116 which are located in substantially intermeshing or alternating relation with the adjacent elements 109 and 110, all as clearly indicated in the figure, these cooperating elements acting to carry the load up to the top of the support. Curved element 117 may be provided for resisting diagonal tension and shear. It will be understood that the opposite end of the reinforcing member 112 may be identical with that actually illustrated in the figure and the latter end may be located in the same relation to a negative reinforcing member provided over another support, or may be located in the beam generally as indicated in Fig. 14, dependent upon the structural conditions. In this modification, it will be understood that the negative and positive reinforcing members constitute separate structural elements. Moreover, each of the elements which extends away from the intermediate portion of the associated reinforcing member is preferably provided at its end with a hook in order to secure firm anchorage with the concrete and to prevent relative flow of the concrete along the element, all as discussed generally in connection with the type of reinforcing illustrated in Fig. 14.

Preferably, the shear prongs 109 and 114 are encircled by a metallic band 109$^a$ and the prongs 110 and 115 by a similar band 115$^a$. These bands may be located at any point intermediate the ends of the associated prongs and the bands may be spaced from each other. Their purpose is to prevent spreading of the concrete under the opposing pull of the prongs which pass therethrough.

In Fig. 37 is illustrated a structural condition substantially identical with that illustrated in Fig. 36, the only distinction between these modifications residing in the fact that, instead of providing two separate reinforcing members to provide for positive and negative bending in the beam, a single reinforcing member 118 is employed. The arrangement of the component elements of this member is identical with the form shown in Fig. 36, except that the positive and negative portions of the reinforcing are positively and unitarily connected after the general manner illustrated in Fig. 16. The strength of the positive reinforce 118 will obviously vary with the conditions of loading and span. Accordingly, it may be as shown, or it may be considerably reduced in cross section and might consist of a single bar forming a continuation of one of the diagonal prongs from the negative reinforce.

In Fig. 38 is illustrated a concrete beam of simple span which is subjected to a fixed, concentrated load. Under these conditions the reinforcing member 119 may be arranged generally as indicated in Fig. 14, that is, with the usual intermediate portion 120 for resisting horizontal tension and hook-ended prongs or elements 121 extending therefrom for resisting diagonal tension and shear. In order to resist the effect produced by the concentrated load, however, an enclosed tie 122 is associated with the intermediate portion 120 and positioned directly under the concentrated load in order to prevent flow of the concrete in this locality. This condition of loading, therefore, approximates that found in a beam that intermediately carries a load or support which provides a condition of concentrated loading. The tie 122 may be formed by suitably bending a separate bar of metal into substantially the circular shape shown, or into the shape illustrated in Fig. 32, and thereafter suitably attaching, as by welding, the same to the intermediate portion 120, or this tie may be formed by suitably bending the uppermost bar of the intermediate portion to form a loop and thereafter continuing the bar to provide the associated diagonal tension or shear prong, as indicated in Fig. 40.

It has been stated that increased compressive resistance in the concrete may be obtained by the use of enclosures properly shaped and attached to the direct reinforcing. When these enclosures are overlapped, they may be made to accommodate moving loads and to obtain greater increase in compressive strength than would be possible with the same amount of metal in a single enclosure. The purpose of enclosures is to restrain the tendency of the concrete under compression to buckle or break away from the main body of the beam. The vertical tensile stress in the body of the beam induced by this tendency to buckle increases toward the longitudinal center line of the beam as the amount of concrete tending to break away becomes larger.

When enclosures overlap, it is particularly desirable to fasten them at their points of contact, thereby creating inside enclosures of smaller volume and a web reinforcing characterized by apexes of varying height in the compression side, the apexes being the intersecting or contacting points of the enclosures. Points of this nature are more clearly shown in Fig. 42. The inside enclosures give larger increases in unit compressive stress because they enclose a smaller volume of concrete. The advantage of fastening the overlapping enclosures at their touching points is that the concrete at the center, which is subjected to greater vertical tension from the buckling tendency, is surrounded by more enclosures than concrete near the compression face.

Referring to Figs. 39 and 40, there are illustrated types of reinforcings for beams subjected to moving loads, it being understood that these forms may be otherwise associated with my characteristic forms of reinforcing including an intermediate portion for resisting horizontal tension and diagonal tension or shear prongs or elements associated therewith. In Fig. 39, the reinforcing detail is formed by a plurality of enclosed ties 123 which are arranged in the overlapping relation indicated and which are preferably fastened together at their points of intersection 124 to form smaller enclosures than those encompassed by each tie with a corresponding reduction in height of the apex of each small enclosure, and also at the surfaces where they touch, denoted generally by the numeral 125, thus providing a plurality of enclosures for resisting spreading of the contained material. In Fig. 40 the reinforcing detail is formed by successively bending a bar of metal 126 into a succession of spaced enclosures 127, each enclosure being fastened at the point designated by the numeral 128 in order to retain its prefixed shape.

While the enclosures illustrated in Figs. 39 and 40 are denoted as being circular in form, structural conditions may dictate the shape illustrated in Fig. 32. Each of these reinforcing details is useful for resisting moving loads, or may be employed in walls where settlements cause high shearing stresses with little bending.

In Fig. 41 is illustrated the application of the reinforcing detail shown in Fig. 39 to a concrete beam of simple span which is subjected to a moving load, the numeral 129 designating a series of enclosing elements which are related generally as indicated in Fig. 39 and which are suitably spaced according to the probable position of the moving load. This detail 129 is fixedly attached to my characteristic reinforcing member 130 which may be provided with the usual elements 131 for resisting diagonal tension and shear, the entire reinforcing being embedded in a concrete beam indicated by the numeral 132. Over the support 133, the reinforcing member preferably incorporates elements 134 which are connected to each other and to the adjacent diagonal tension element 131 by curved portions 135 for resisting end flow, as generally discussed in connection with Fig. 34.

In Figs. 42 and 43 is illustrated a beam 136 which is subject to reversible stresses, such as occur in a building under wind loading. Embedded in the concrete composing this beam is a reinforcing element 137 which may be composed of one or more bars suitably connected together to prevent relative slippage and which is located adjacent the lower side of the beam and a similar element 138 positioned adjacent the upper side of the beam, these elements providing for positive and negative bending, respectively. These elements are further positively fastened to a plurality of enclosing elements 139 of the general type indicated in Fig. 39 and the spacing of these elements will depend upon the probable position and direction of the load to which the beam is subjected. Fig. 43 illustrates the relation of the elements 137 and 138 to the enclosing elements 139.

Fig. 44 illustrates a further modification of my improved reinforcing as applied to a structural beam 140 which, in the present instance, is indicated as being an I-beam having the usual intermediate web 141 and the transversely extending flanges 142 at the top and bottom of the web. It is contemplated that this structural beam will be embedded in concrete and in order to properly reinforce the concrete against flow and for resisting direct tension stresses, one side of the beam may have embedded in the concrete between the flanges 142 a reinforcing member 143 comprising an elongated loop formed by suitably bending a bar, this loop having the curved ends 144 and the flat top and bottom sides 145, which are fastened to the flanges 142. A similarly shaped reinforcing member 146, but shorter in length, is positioned within the member 143 with its flat top and bottom sides 147 fastened to the sides 145 to prevent relative slippage and its curved ends 148 spaced from the ends 144. A parti-circular bar 149 is secured to each end 148 and to the member 143 in complementary relation to the adjacent end 144 so as to provide at each end of the beam a substantially circular enclosure 150. A bar 151, shaped like the bar 149 is secured at each end of and within the member 146 in complementary relation to the adjacent curved end 148 to provide substantially circular enclosures 152. Between the bars 151 is located a plurality of circularly bent bars 153 providing a succession of equi-spaced enclosures 154. The bars fit closely in the space between the sides 147 and are fastened thereto as well as to each other at their points of contact. There is thus provided along the beam a succession of enclosures which are embedded in the concrete and effectively restrain the same against flow.

On the opposite side of the web, a similar reinforcing system, denoted generally by the numeral 155 and indicated by dotted lines, is employed, but preferably shifted endwise with respect to the system shown in full lines a distance equal to one-half of the diameter of a full line enclosure. Considering the entire beam as a unit, then, the enclosures on opposite sides of the structural beam are positioned in overlapping relation.

The systems on opposite sides of the web may be spaced therefrom, as illustrated in Fig. 45, or may be placed with their side surfaces welded, or otherwise fastened in touching relation, to the beam web. It will be understood that the enclosures of each system in Fig. 44 may have the circular form shown or they may have the form illustrated in Fig. 32.

In Figs. 46 to 49, inclusive, there is illustrated the application of my improved reinforcing to a simple concrete T-beam. In Figs. 46 and 47, the numeral 156 designates my typical reinforcing which is located in the web portion of the beam 157 and which is provided with the usual elements 158 for resisting diagonal tension and shear. Associated with the reinforcing member 156 may be a pair of elements or prongs 159 which are connected to each other by a curved portion 160 for resisting end flow over a support 161 as already discussed in Fig. 34. The diagonal tension elements 158 extend upwardly into the T-portion of the beam for connection to the T reinforcing members indicated generally by the numerals 162, 163 and 164 whose shape and arrangement may correspond, respectively, to the reinforcing details illustrated in Fig. 27 or 28. The arrangement of the rinforcing members 162, 163 and 164 may vary, that is, they may be placed flat in the T of the beam, but are preferably upright or curving toward the point of maximum moment, Fig. 46 illustrating a characteristic condition. Preferably, the T-reinforcing illustrated in Fig. 46 should theoretically curve from the 45° inclination of the shear prong in the web of the beam to which it is attached, through at least a sufficient angle to occupy a position at right angles to the extreme compressive fibers of the concrete in the same manner as the prongs in a rectangular beam. Fig. 47 illustrates more clearly the detailed arrangement of the reinforcing in the T-portion of the beam where the reinforcing is arranged in an upright position. As indicated, this T-reinforcing corresponds generally to my characteristic reinforcing, as illustrated in Fig. 14, in that it is composed of a plurality of bars securely fastened together and from which prongs or elements 165 depart, each of the prongs being preferably provided with hooked ends for reasons already noted.

Figs. 48 and 49 illustrate types of T-reinforcing which additionally incorporate enclosing members 166 and 167 for the purpose of resisting spreading of the surrounding material, Fig. 48 showing a T-beam having a larger section and a wider T than the beam illustrated in Fig. 47 and Fig. 49 showing a T-beam having a T only on one side of the web. The elements comprising the T-reinforcing may be formed of either flat or round bars, but will ordinarily be composed of light wire because of the relatively small stresses encountered in this portion of a T-beam.

In Fig. 50, there is illustrated a variation of the structural reinforcement illustrated in Fig. 15, but intended for use in wall corners or to provide end restraint in an exterior column. This reinforcing detail is indicated by the numeral 168 and it incorporates an enclosing tie 169 for resisting spreading of the concrete and may have permanently fastened thereto the elements 170 and 171 which are shaped to conform to the corner shape of the structural member and provided with hooked ends.

In Fig. 51, there is illustrated a system of reinforcing for resisting positive and negative moments under conditions similar to that illustrated in Fig. 36. The numeral 172 designates a concrete beam which is carried intermediate its ends on a support 173. A characteristic unitary reinforcing member 174 is embedded in the beam over the support and embodies an enclosed tie 175 directly over the support, downwardly curved, shear prongs 176, and straight prongs 177 for picking up the load from the midspans of the beam on opposite sides of the support and also a reinforcing element 178 for resisting a condition of partial loading. The ends of each prong 177 are preferably hooked and the hooked end of one prong is fastened to the adjacent prong 177 to form an enclosure 179. The enclosure 179 might be formed by simply forming a return bend in the prong 177.

In the mid-span to the right of the support, a positive unitary reinforce 180 is located adjacent the lower side of the beam and it incorporates at the end adjacent the support a pair of prongs 181 which extend upwardly toward the top of the beam and on opposite sides of enclosure 179. Within the enclosure, the ends of the prongs 181 may be encircled by a band 182 for resisting spreading of the prongs 181.

In the beam to the left of the support is also located a positive, unitary reinforce 183 which also includes a prong 184 that extends upwardly toward the top of the beam. The prong 184 is looped through the enclosure 179 and bent back upon itself in a substantially linked relation to the enclosure. The return and upwardly extending portions of the prong 184 may be encircled by a band 185 which acts the same as does the band 182.

It will be understood that, under conditions of relatively low stress, the bands 182 and 185 may be omitted. The linking of the positive and negative reinforcings may be substantially as illustrated, or the link construction shown at either end of the negative reinforce may be used at both ends.

It will be obvious that the illustration of specific forms of my improved reinforcing unit in particular structural environments does not preclude the use of any of the other forms under the same or similar conditions of operation. The choice of a reinforcing unit will in general depend upon the usual factors which dictate the selection of a structural design, such as location of the unit, and the nature, extent and location of the imposed load.

I claim:

1. A reinforcing member for a heterogeneous beam comprising a plurality of individual bars securely welded together to prevent relative slippage and separation and to form a substantially solid, intermediate and laminated portion having a varying cross section and separated elements extending from the portion and making uniform angles therewith for resisting diagonal tension and shear, each bar within the portion being securely held to the other bars within the portion up to and including the point at which the associated element departs.

2. A reinforcing member for a heterogeneous beam comprising a plurality of bars held together to prevent relative slippage and separation and to form a substantially unitary, intermediate and laminated portion, and elements extending from the portion for resisting diagonal tension and shear, one or more of said elements being formed into a closed loop or tie for preventing spreading of the concrete under heavy or concentrated loading, such as over a support.

3. A reinforcing member for a heterogeneous beam subjected to concentrated loading such as occurs over a support comprising a plurality of bars held together to prevent relative slippage and separation and to form a substantially unitary, intermediate and laminated portion having a varying cross section, the ends of one or more of the bars being bent away from the portion and secured together, respectively, to form enclosed ties for resisting spreading of the embedding material under the concentrated load and the remaining bars being bent from the portion to form prongs.

4. A reinforcing member for a heterogeneous beam subjected to negative bending moment over a support comprising a plurality of bars held together to prevent relative slippage and separation and to form a substantially unitary, intermediate and laminated portion having a varying cross section, the ends of one or more of the bars being bent away from the portion and secured together, respectively, to form enclosed ties for resisting spreading of the embedding material under the reaction of the support, and the remaining bars being bent away from the portion to form prongs whose projected length in the zone of negative bending decreases progressively.

5. A reinforcing member for a heterogeneous beam comprising a plurality of bars held together to prevent relative slippage and separation and to form a substantially unitary, intermediate and laminated portion having a varying cross section, the individual bars being extended away from the portion to form prongs, certain of the prongs beyond the longitudinal center line of the beam making increasing angles therewith toward the center of the beam, and the ends of certain of the prongs being secured together to form substantially unitary, end portions offset from the intermediate portion, the intermediate and end portions resisting horizontal tension created by positive and negative moments, respectively.

6. In heterogeneous construction, the combination of a support, fireproofed beams resting thereon, and a reinforcing member embedded in the fireproofing comprising a plurality of bars held together to prevent relative slippage and separation and to form a substantially unitary, intermediate and laminated portion located over the support for resisting horizontal tension, elements extending from the portion for resisting diagonal tension and shear, and a second reinforcing member embedded in the fireproofing intermediate the ends of each beam comprising a plurality of bars securely fastened together to form a substantially unitary, intermediate portion for resisting horizontal tension and elements extending from the last named portion for resisting diagonal tension and shear.

7. In heterogeneous beam construction, the combination of a T-beam having a plurality of bars located in the web of the beam and welded together to prevent relative slippage and separation and to form a substantially unitary, intermediate and laminated portion, said portion constituting the main tension reinforcing of the beam, and elements extending from the portion and cooperating therewith for resisting diagonal and cooperating therewith for resisting diagonal tension and shear, each bar within the portion being securely held to the other bars within the portion up to and including the point at which the associated element departs therefrom.

8. A reinforcing member for a heterogeneous beam comprising a plurality of bars welded together to prevent relative slippage and separation and to form a substantially unitary, intermediate and laminated portion, and elements extending from the portion for resisting diagonal tension and shear, one or more of the elements being bent to provide an enclosing formation having bulging sides and adapted to be embedded in the surrounding material for resisting spreading of the material created by the concentrated load or support.

9. A reinforcing member for a heterogeneous beam comprising a unitary, intermediate portion, and elements extending from the portion for resisting diagonal tension and shear, some of said elements being formed into a curved shape with the ends of some of the curved elements directed toward each other for preventing spreading of the concrete under heavy or concentrated loading, such as over a support.

10. A reinforcing member for a heterogeneous beam subjected to concentrated loading such as occurs over a support comprising a unitary, intermediate portion for resisting horizontal tension, some elements extending away from the portion in arcuated forms with the ends of some of said arcuated elements directed toward each other, respectively, for resisting spreading of the embedding material under concentrated load, and other elements extending away from the portion to form prongs.

11. A reinforcing member for a heterogeneous beam subjected to negative bending moment over a support comprising a unitary, intermediate portion for resisting horizontal tension, elements extending away from the portion and diagonally toward each other for resisting spreading of the embedding material under the reaction of the support, and other elements extending away from the portion to form prongs whose horizontal projections vary in the zone of negative bending.

12. A reinforcing member for a heterogeneous beam comprising a plurality of bars held together to prevent relative slippage and separation and to form a substantially unitary, intermediate portion, the individual bars being extended to form prongs, the ends of certain of the prongs being secured together to form a substantially unitary, end portion offset from the intermediate portion, certain of the prongs forming a part of the end portion being arranged with a curved shape with the ends of each curved prong directed toward each other for preventing spreading of the concrete, the intermediate and end portions resisting horizontal tension created by positive and negative bending moments, respectively.

13. In heterogeneous construction, the combination of a metallic structural beam having a web adapted to be covered by the material reinforced and a reinforcing member for embedding in the material adjacent the web comprising a unitary, intermediate portion for resisting horizontal tension, and elements extending from the portion for resisting diagonal tension and shear, some of said elements having an arcuated shape with the ends thereof directed toward each other, respectively, for resisting spreading of the embedding material.

14. In heterogeneous construction, the combination of a metallic structural beam having a web adapted to be covered by the material reinforced and spaced flanges extending transversely from the web, and a reinforcing member for embedding in the material adjacent the web and between the flanges comprising a unitary, intermediate portion for resisting horizontal tension, elements extending away from the portion for resisting diagonal tension and shear, some of said elements being formed into an arcuated shape with the ends thereof directed toward each other, respectively, for resisting spreading of the embedding material under concentrated load.

15. In heterogeneous construction, the combination of a metallic structural beam having a web adapted to be covered by the material reinforced and spaced flanges extending transversely from the web, and a reinforcing member for embedding in the material adjacent the web and between the flanges comprising a unitary, intermediate portion for resisting horizontal tension, elements extending away from the portion for resisting diagonal tension and shear, the end of some of the elements being directed diagonally toward each other, respectively, in the upper compressive region of the beam to form enclosing formations for resisting spreading of the concrete under load.

16. In beam construction, the combination of a metallic, compression member having ends extended for bearing, and a tension system depending therefrom and adapted to be embedded in concrete comprising a plurality of bars held together to prevent relative slippage and separation and to form a horizontal tension member in the web formed by the concrete and the embedded tension system, and curved web tension members connecting the compression and horizontal tension members in the concrete adapted to exert a compressive force on the concrete, compression in the web of the beam being provided by the concrete.

17. In heterogeneous construction, the combination of a T-beam having unitarily connected, direct tension elements and diagonal tension elements located in the web of the beam, and other tension elements located in the bottom of the T of the beam, a portion of each of said last-named elements adjacent the web of the beam being disposed substantially at right angles thereto, and another portion of some of said last-named elements further out in the T from the web of the beam extending in a different direction than said first-named portion, said last-named elements cooperating with the elements in the web of the beam.

18. In heterogeneous construction, the combination of a T-beam having unitarily connected, direct tension elements and diagonal tension elements located in the web of the beam, and other tension elements located in the bottom of the T of the beam, a portion of each of said last-named elements adjacent the web of the beam being disposed substantially at right angles thereto, another portion of some of said last-named elements further out in the T from the web being diagonally disposed relative to the web of the beam, and one or more of said last-named elements being formed into an enclosing loop or tie for preventing spreading of the concrete, all of said last-named elements cooperating with the elements in the web of the beam.

19. In heterogeneous construction, the combination of a T-beam having unitarily connected, direct tension elements and diagonal tension elements located in the web of the beam, and a reinforcing member located in the bottom of the T of the beam comprising a plurality of bars held together to prevent relative slippage and separation and to form a substantially unitary, intermediate and laminated portion having a varying cross section, said intermediate portion being disposed substantially at right angles to the web of the beam, certain of the bars further out in the T being bent away from the intermediate portion and diagonally disposed relative to the web of the beam, and certain of the other bars forming enclosing ties for resisting spreading of the embedding material under load, the T-reinforcing member cooperating with the elements in the web of the beam.

20. In heterogeneous construction, the combination of a T-beam having unitarily connected, direct tension elements and diagonal tension elements located in the web of the beam, and a reinforcing member located in the bottom of the T of the beam comprising a plurality of bars welded together to prevent relative slippage and separation and to form a substantially unitary, intermediate and laminated portion, the intermediate portion being located adjacent the web of the beam and disposed substantially at right angles thereto, certain of the bars being bent away from the portion for resisting diagonal tension and shear and one or more of the bars being bent to provide an enclosing formation having bulging sides for resisting spreading of the embedding material under load, the T-reinforcing member cooperating with the elements in the web of the beam.

21. In heterogeneous construction, the combination of a plurality of metallic elements adapted to be embedded in the material reinforced, one of the elements comprising a metallic beam having a web and spaced flanges extending transversely from the web and the other elements comprising reinforcing members connected to the intermediate portion of the beam to form therewith a unitary, intermediate section for resisting horizontal tension, each member having arcuate prongs extending therefrom between the flanges, certain of the prongs being directed toward each other opposite the intermediate portion of the associated member for resisting spreading of the embedding material under a load.

22. A reinforcing member for a heterogeneous structure comprising a unitary reinforce having a direct tension element adapted for positioning in the tension side of the structure and diagonal tension elements extending from the direct tension element and adapted to be located substantially in the longitudinal vertical plane of and directed toward the compression side of the structure, some of the diagonal tension elements being connected by a curved element in the region of the external force to form an enclosure for resisting spreading of the concrete.

23. A reinforcing member for a heterogeneous structure comprising a unitary reinforce having a direct tension element adapted for positioning in the tension side of the structure and diagonal tension elements extending from the direct tension element and adapted to be located substantially in the longitudinal vertical plane of and directed toward the compression side of the structure, some of the diagonal tension elements being connected by a curved element in the region of the external force to form an enclosure for resisting spreading of the concrete and certain of the other diagonal tension elements being adjacently directed toward each other.

24. A reinforcing member for a heterogeneous structure comprising a unitary reinforce having a direct tension element adapted for positioning in the tension side of the structure and diagonal tension elements adapted to be located substantially in the longitudinal vertical plane of and directed toward the compression side of the structure, the diagonal tension elements being connected in the region of a support at the end of the member by a curved element to form an enclosure for resisting spreading of the concrete.

25. A reinforcing member for a heterogeneous beam comprising a plurality of bars held together to prevent relative slippage and separation and to form a substantially unitary, intermediate and laminated portion, having a varying cross section, the individual bars being extended away from the portion to form prongs, certain of the prongs beyond the longitudinal center line of the beam making increasing angles therewith toward the center of the beam, the ends of certain of the prongs being secured together to form substantially unitary, end portions offset from the intermediate portion, the intermediate and end portions resisting horizontal tension created by positive and negative moments, respectively, and certain of the prongs associated with a portion being directed toward each other to form enclosing ties for resisting spreading of the embedding material under a concentrated load.

26. In heterogeneous construction comprising a concrete beam resting on a support and extending therebeyond, the combination of a reinforcing member adapted to be located in the upper part of the beam over the support comprising a unitary, intermediate portion for resisting horizontal tension, and shear prongs diverging from the portion, certain of the prongs over the support being bent into one or more enclosing formations for resisting spreading of the concrete, and a second reinforcing member located in the lower part of the beam beyond the support comprising a unitary, intermediate portion for resisting horizontal tension, and shear prongs diverging therefrom, the adjacent prongs of the portions being located in alternating relation in the concrete.

27. A reinforcing member for a heterogeneous beam comprising a unitary reinforce having a direct tension element and diagonal tension elements extending therefrom and adapted to be positioned substantially in the longitudinal vertical plane of the beam and directed toward the compression side of the beam, some of the diagonal tension elements being connected in the region of the external force by curved elements forming one or more enclosures for resisting spreading of the concrete.

28. A reinforcing member for a heterogeneous structure comprising an element for resisting direct tension and an enclosure element for resisting spreading of the embedding material, the direct tension and enclosure elements being immovably connected and the enclosure element being curved generally opposite the connection of the elements.

29. A reinforcing member for a heterogeneous structure comprising an element for resisting direct tension and a plurality of enclosure elements arranged in overlapping relation for resisting spreading of the embedding material, the direct tension and enclosure elements being connected to form a unitary reinforce, and the enclosure elements being fastened to each other to prevent relative slippage and being curved generally opposite their connection with the tension element.

30. In heterogeneous construction, the combination of a concrete beam adapted to rest on a support and to extend therebeyond, a reinforcing member located in the upper part of the beam over the support comprising a unitary, intermediate portion for resisting horizontal tension and diagonal tension prongs diverging from the portion, a second reinforcing member located in the lower part of the beam beyond the support comprising a portion for resisting horizontal tension and diagonal tension prongs diverging therefrom, the adjacent prongs of the portions extending toward each other in the concrete, and bands encircling groups of the oppositely extending prongs to prevent spreading of the concrete.

31. In continuous heterogeneous beam construction, the combination of a unitary reinforcing unit having an enclosing member and diagonal tension prongs located over a support, a second reinforcing unit having diagonal tension prongs located between adjacent supports, the adjacent prongs of the units extending toward each other and certain of the unit prongs, respectively, being substantially linked to each other, and a band encircling some of the diagonal tension prongs from either reinforce.

32. In continuous heterogeneous beam construction, the combination of a unitary reinforcing unit located over a support and having diagonal tension prongs, one or more of the prongs at one end of the unit forming an enclosing tie, and a second reinforcing unit located in the lower part of the beam on one side of the support and having diagonal tension prongs, the adjacent prongs of the units extending toward each other and one or more prongs from the second unit being substantially linked to the enclosing tie.

33. In heterogeneous construction, the combination of a metallic structural beam having a web adapted to be covered by the embedding material and spaced flanges extending transversely from the web, and a plurality of spaced, curved members fastened to the beam and arranged in succession along and in both directions from the central portion of the beam, the members on opposite sides of the central portion being oppositely curved and being directed toward the central portion at their points of connection with the flanges.

34. A reinforcing member for heterogeneous construction comprising a direct tension element for resisting negative bending, such as over a support, and having immovably connected thereto diagonal tension elements extending therefrom, some of which are curved to provide enclosures located substantially in the plane of application of the reaction force for preventing spreading of the embedding material, and others are extended to form a reinforce for resisting positive bending in the adjacent span.

35. A reinforcing member for a heterogeneous structure comprising a substantially flat, lattice-like member defining a plurality of enclosures of varying size for resisting spreading of the embedding material, the enclosure sides being secured together at their respective points of contact to prevent relative slippage and at least one side of some of the enclosures being curved between their respective points of contacts with adjacent enclosure sides.

36. A unitary reinforce for heterogeneous construction comprising a main tension element and other elements located substantially in the plane of the main tension element and immovably connected thereto, said other elements forming enclosures of varying height as measured from the main tension element, the enclosures of greatest height being curved generally opposite the main tension element for resisting spreading of the embedding material.

37. In continuous heterogeneous beam construction, the combination of a unitary reinforce having an enclosing member and shear prongs located over a support, and a second reinforce located between supports and substantially linked to the unitary reinforce.

JOEL E. McLAFFERTY.